Oct. 19, 1943.     I. BENJAMINS     2,332,045
AIRPLANE
Filed Feb. 24, 1940
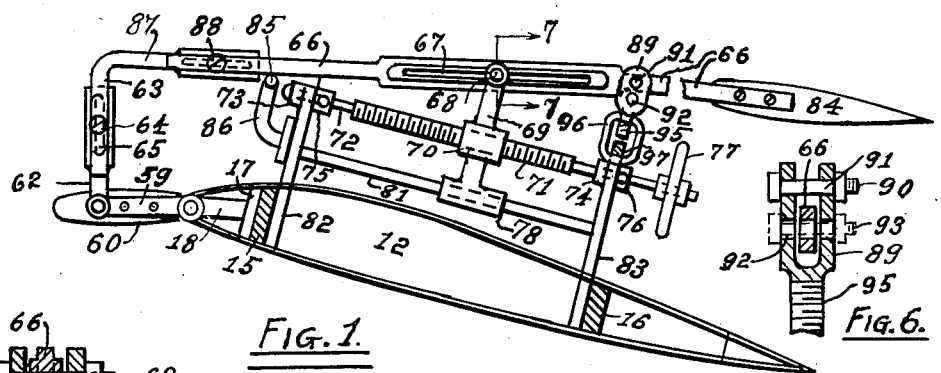
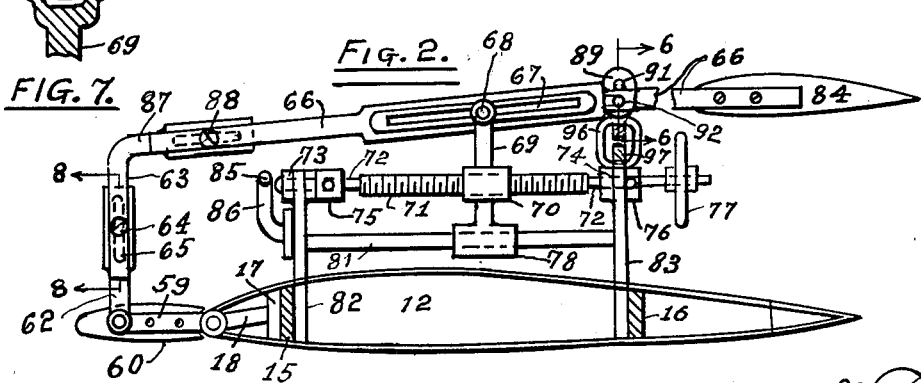
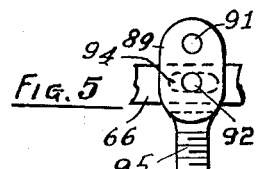
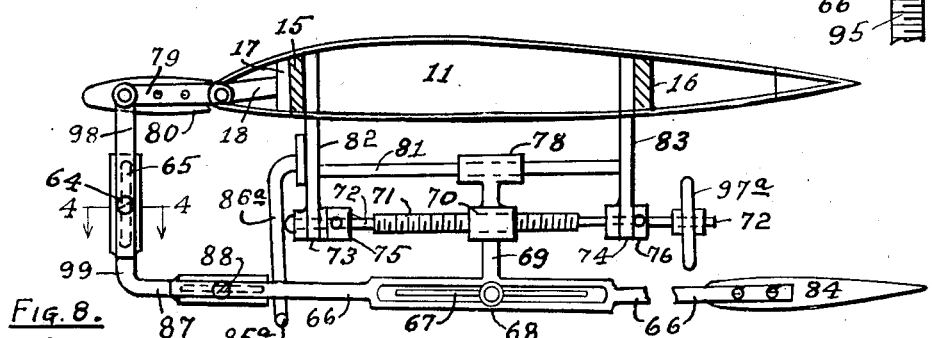
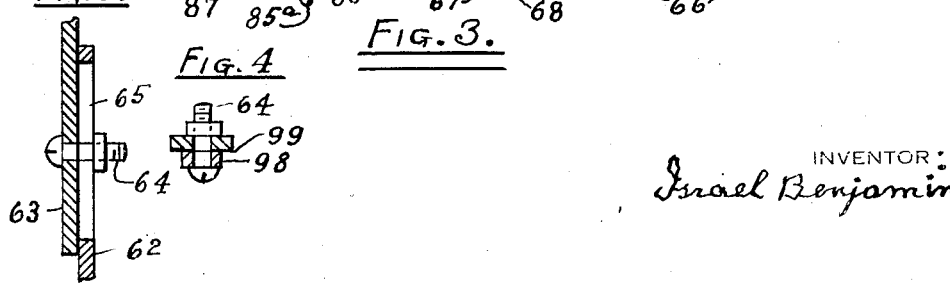
INVENTOR:
Israel Benjamins.

Patented Oct. 19, 1943

2,332,045

UNITED STATES PATENT OFFICE 2,332,045

AIRPLANE

Israel Benjamins, Brooklyn, N. Y.

Application February 24, 1940, Serial No. 320,674

4 Claims. (Cl. 244—82)

This invention relates to improvements in airplanes, and it consists in the novel features which are hereinafter described.

One of the objects of my invention is to increase the efficiency of airplane wings, especially for relatively coarse angles of attack as when the airplane is being taken off the ground or when fully loaded.

Another object is to increase the lift of an airplane, thereby enabling it to take on more fuel and thereby increasing its radius of flight, or to reduce the power required to propel it for a given lift.

A further object is to shorten the length of the run, or the distance which an airplane must run on the ground, with a given load, before being raised into the air; or to reduce the velocity of the airplane at which it leaves the ground.

A still other object of my invention is to increase the angle of attack at which stalling would begin, or to delay stalling.

Another object is to maintain longitudinal stability of an airplane in an emergency as when the elevator of the airplane is out of order or is shot away in battle.

Other objects and advantages will hereinafter appear.

I attain these objects by the device which is illustrated in the drawing or by mechanical equivalents and obvious modifications of the same.

In the drawing Fig. 1 is a view partly in elevation and partly in section of a wing of an airplane equipped with my device, in which the wing is shown as having a large angle of attack as when the airplane is taken off the ground.

Fig. 2 is a similar view but with the angle of attack very small as when flying at a very high velocity. In both Figs. 1 and 2 the wing is that of a low wing monoplane.

Fig. 3 is a view similar to Figs. 1 and 2, but the wing is that of a high wing monoplane, with the mechanism of the device shown below the wing instead of above the wing as in Figs. 1 and 2.

Fig. 6 is a detail partly in elevation and partly in section on the line 6—6 of Fig. 2.

Fig. 7 is a detail in section on the line 7—7 of Fig. 1,

Fig. 8 is a detail in section on the line 8—8 of Fig. 2,

Fig. 4 is a detail in section on the line 4—4 of Fig. 3, and

Fig. 5 is a detail in side elevation of the parts shown in Fig. 6.

Figs. 6, 7, 8, 4 and 5 are drawn to a larger scale than Figs. 1, 2 and 3.

Similar numerals refer to similar parts throughout the several views; and the sectional views are taken each in the direction as shown by the arrows.

In the modification of my device which is shown in Figs. 1 and 2 of the drawing the adjustable nose member 60 is hingedly connected to the brackets 17—18 by means of bars 59 which are secured to the member 60, which is also pivotally connected at 61 to the lower end of a rod 62—63 which consists of two lengths 62 and 63 which are adjustably secured to each other by means of a bolt 64 which passes through an aperture in the part 63 and a slot 65 in the part 62, as shown in Fig. 8.

The length 63 is shown as integral with a longitudinally disposed movable beam or lever 66 which has therein a slot 67 and is pivotally and slidably connected by means of a pin 68 to a post 69 which is carried by a nut 70, which is in engagement with a feed screw 71 which is rotatably mounted by being secured to a spindle 72, which is pivotally mounted in bearings 73 and 74.

The spindle 72 has secured thereto sleeves 75 and 76, to prevent longitudinal displacement of the spindle 72 with relation to said bearings 73 and 74, and it also has secured thereto at the end thereof a hand wheel 77.

The nut 70 may be made in two halves, if desired, and it has integral therewith or connected thereto a sleeve 78 which slides on a guide rod 81 which is secured at one end thereof to a standard 82, which is secured to the rear side of the spar 15, and at the other end thereof to a standard 83 which is secured to the spar 16.

The handwheel 77 may be located in or be accessible from the cockpit of the pilot or some other part of the fuselage which is omitted in the drawing.

It will be understood that the wings of the airplane are rigidly secured to the fuselage.

The lever 66 has secured thereto at the rear end thereof an air reaction member 84 of sufficient size and placed far enough from the pin 68 to more than counterbalance the member 60 and control the position of the latter.

The member 84 extends into and is disposed to float in the downwash of the wings of the airplane and is rotated by a change in the direction of the downwash.

The lever 66 is shown as having a part thereof near the member 84 broken away for want of room on the drawing, and it may have any desired length.

The position of the member 84 will depend on the distance thereof from the wing 12 and also upon the angle of attack and the velocity of the airplane; a change in the angle of attack or in the velocity of the airplane will produce a change in the direction of the downwash and cause the member 84 to turn on its pivot at 68, thereby either raising or lowering the member 60. The amplitude of the member 84 will be less than that of the member 60 if the latter is to be kept in line with the headwind; and the arm of the lever 66 at the left of the pin 68 is therefore made longer than the radius of rotation of the member 60.

To make the action of the device automatic and also to correct for changes of velocity of the airplane, the position of the pin 68 in the slot 67 is made adjustable by means of the nut 70, the feed screw 71 and the hand wheel 77; this position may be determined by experiment and also by trial and error by the pilot.

Turning the handwheel 77 in one direction will raise the member 60 and turning the handwheel 77 in the opposite direction will lower the member 60 for a given velocity and angle of attack of the airplane.

In an emergency as when the elevator of an airplane is destroyed in battle, the longitudinal stability of the airplane may be maintained by adjusting the position of the pin 68 with relation to the lever 66 by means of the nut 70, the handwheel 77 and the feed screw 71.

To keep the member 60 from dropping too low when the airplane is on the ground I provide a stop 85 on a bracket 86, which is secured to the post or standard 82, to intercept the lever 66 when the member 60 is in line with the headwind or at any desired angle to it when the wing is at its angle of attack which corresponds to the position of the airplane on the ground, as shown in Fig. 1.

The lever 66 has thereon also an expansion joint at 87—88 similar to the expansion joint of the rod 62—63, for purposes of experimenting to determine the best position of the slot 67 on the lever 66; but this feature may be omitted after the experimental stage has been passed.

To prevent undue oscillation of the lever 66 by vertical currents I provide an emergency bearing 89 with a removable pin 90 therein as shown in Fig. 6; the pin 90 may be passed through the openings 91 and connected to the prongs of the bearing 89 after the airplane has reached its normal velocity, whereby the lever 66 is kept from being unduly deflected by any vertical currents, thereby also restricting the amplitude of the member 60. Before taking off, the pin 90 may be removed to permit the deflection or turning of the member 60 into the position as shown in Fig. 1.

To prepare against the emergency of the member 84 being lost by accident or destroyed in battle I provide the bearing 89 with another pair of openings 92 for a pin 93 to be passed therethrough, as shown in dotted lines in Fig. 6.

The part of the lever 66 at said bearing 89 is provided with an oblong opening or slot 94 for the pin 93 to pass therethrough; the bearing 89 itself is shown as having at the lower end thereof a stem 95 which is threaded right-handed and is connected by means of a turnbuckle 96 to a stem 97 on the bearing 74, the stem 97 being threaded left-handed.

By means of the turnbuckle 96 and the stems 95 and 97 the bearing 89 may be brought with the openings 92 therein into registration with the opening or slot 94 in the lever 66, whereby to pass the pin 93 therethrough, thereby pivotally connecting the lever 66 to the bearing 89; thereupon, the member 60 may be raised by manually turning the handwheel 77 with the screw 71 in one direction, and it may be lowered by turning the handwheel 77 with the feed-screw 71 in the opposite direction. This result is attained by placing the feed screw 71 at an angle to the lever 66, as shown in Figs. 1 and 2.

The rod 62—63 of the device is shown in Figs. 1, 2 and 3 as integral with the lever 66, and not pivoted to it; this was designed to prevent the rearward drag of the headwind, exerted on the end of the member 84, from lifting or depressing the member 60, as would be the case if the rod 62—63 were pivotally connected to the lever 66.

The modification of my device which is shown in Fig. 3 differs from that of Figs. 1 and 2 mainly in that it is applied to a high wing monoplane, and the mechanism, as well as the fuselage which is not shown is located underneath the wing 11 instead of above it.

The nose member 80 and the bars 79, by which it is hinged to the wing 11, are substantially the same as the member 60 and the bars 59 above described; the rod 98—99 corresponds to the rod 62—63 of Figs. 1 and 2 and differs very little from it; the handwheel 97a corresponds to the handwheel 77 of Figs. 1 and 2; and the bracket 86a with the stop 85a correspond to the bracket 86 and the stop 85 of Figs. 1 and 2, but are inverted in position and extend past the lever 66 to the underside of the latter.

All the other parts of the mechanism are designated by the same numerals as in Figs. 1 and 2, and are identical with the latter; however, the emergency bearing 89 and the turnbuckle 96 with the adjacent parts are omitted in the device of Fig. 3; these features have been sufficiently well illustrated in Figs. 1 and 2 and have been hereinbefore described.

Variations are possible, and parts of my invention may be used without other parts. I do not, therefore, restrict myself to the details as shown in the drawing.

Wherever the term "rotatably connected" is used in the claims hereinafter, it is meant to describe an arrangement which is analogous to the connection of an engine crank to the frame of the engine and to exclude the connection of any two mechanical members which are joined to each other by means of a rod which is pivotally connected at each end thereof to one of said members.

I claim as my invention and desire to secure by Letters Patent:

1. In an airplane having thereon one or more wings, an adjustable nose hingedly connected to the forward end of said wings, an air reaction member rotatably connected forwardly thereof to a part which is normally stationary with relation to the wings and extending into the downwash of said wings, a means for transmitting to said nose the rotation of said member with relation to said part and a means for varying and adjusting the ratio of the amplitude of said nose to the amplitude of said member.

2. In an airplane having thereon one or more wings, an adjustable nose hingedly connected to the forward end of said wings, a lever rotatably connected to a part which is normally stationary with relation to the wings, an air reaction member, secured to the rear end of said lever, and extending into the downwash of said wings, a means for transmitting to said nose the rotation of said member with relation to said part and a means for varying and adjusting the ratio of the amplitude of said nose to the amplitude of said member, said varying means comprising an adjustable fulcrum for said lever movably supported on said part and a means for adjusting the position of said fulcrum on said lever and for holding it in place in said position.

3. The elements of claim 1, said fulcrum being slidably connected to said lever and movably supported on said airplane, a means for adjusting the position of said fulcrum on said lever and for holding it in place in said position, thereby controlling the position of said nose, combined with an emergency bearing, having therein one or more openings for a pin to be placed therein, and said lever having therein an opening for said pin to pass therethrough, whereby, when said reaction member is accidentally removed, said lever may be pivotally connected to the said emergency bearing, and said adjusting means being adapted to turn the said lever on said pin when moving said fulcrum on said lever, thereby adjusting the position of said nose with relation to said wing.

4. The elements of claim 1, said fulcrum being slidably connected to said lever and movably supported on a part which is secured to said airplane, a rod extending from said lever to said nose and pivotally connected to the latter, said rod being integral with said lever, thereby preventing the drag of the headwind on the end of the reaction member from moving the nose out of position and a means for adjusting the position of said fulcrum on said lever and for holding it in place in said position.

ISRAEL BENJAMINS.

CERTIFICATE OF CORRECTION.

Patent No. 2,332,045. October 19, 1943.

ISRAEL BENJAMINS.

It is hereby certified that error appears in the printed specification of the above numbered patent requiring correction as follows: Page 3, first column, line 13, and second column, line 9, for "claim 1" read --claim 2--; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.